Patented June 8, 1948

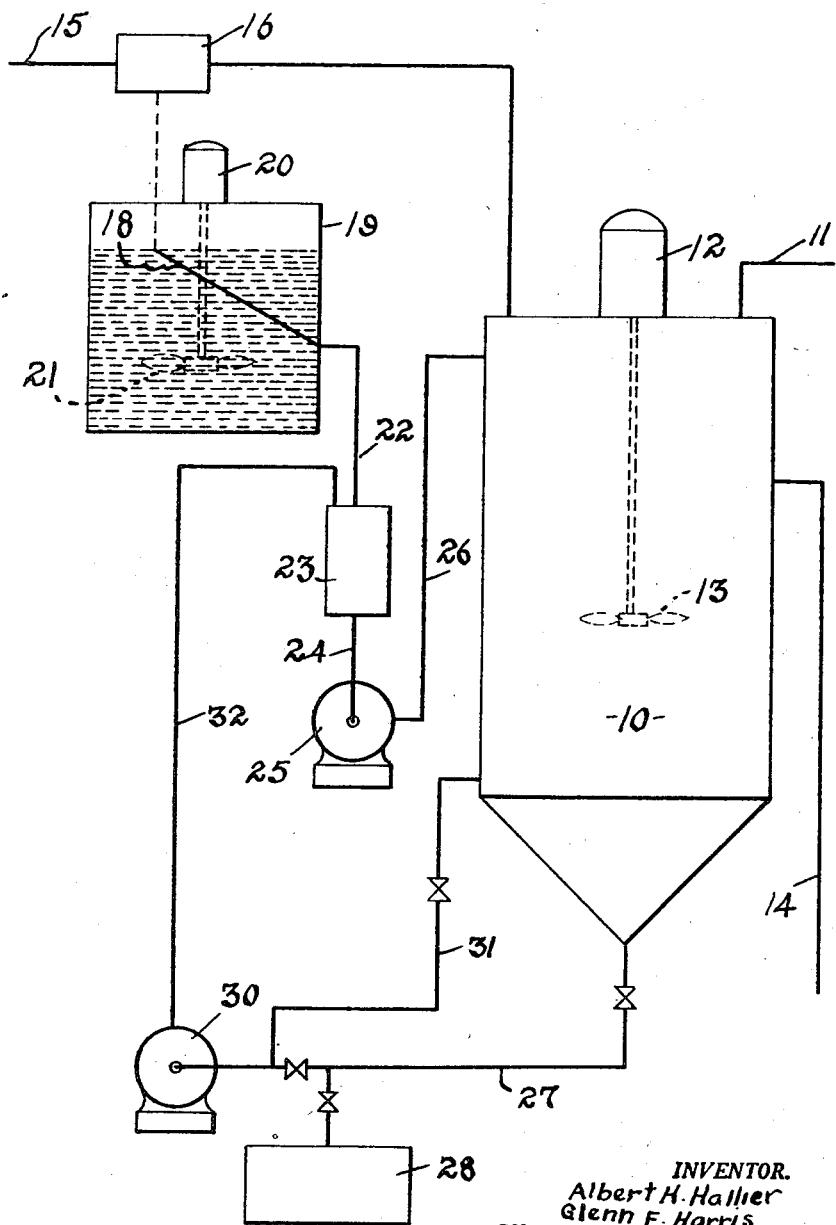

2,442,809

UNITED STATES PATENT OFFICE 2,442,809

WATER TREATING SYSTEM COMPRISING A SEDIMENTATION TANK HAVING A REAGENT LINE AND MEANS FOR WITHDRAWING SLUDGE FROM SAID TANK AND ADDING IT TO SAID LINE

Albert H. Hallier, Glenn F. Harris, Walter C. Kincaid, Edward R. Denson, and Robert H. Davis, Kansas City, Kans., assignors to Phillips Petroleum Company, a corporation of Delaware Application August 2, 1944, Serial No. 547,694

2 Claims. (Cl. 210—16)

This invention relates to a method and apparatus for preventing the formation of scale in the chemical supply lines of, and to improve the efficiency of the hot lime-soda water treating method by the recirculation of sludge from the sedimentation tank through the chemical lines.

An important object of this invention is to provide a method and apparatus for use in the hot lime-soda method of water treating for preventing the formation of scale in the chemical supply lines for the apparatus and process.

Another object of the invention is to improve the efficiency of the hot lime-soda water treating method.

A further object of the invention is to increase the useful life of the chemicals employed in the hot lime-soda water treating method.

A still further object of this invention is to improve the operating efficiency of apparatus of this type by greatly lengthening the periods between reconditioning of the apparatus by reason of the prevention of the formation of scale in the chemical lines thereof.

Other and more detailed objects of the invention will be apparent from the following detailed description of the method and apparatus employed in the hot lime-soda water treating system and method as well as apparent from the following description when taken in connection with the attached drawings.

This invention resides substantially in the combination, construction, arrangement, relative location of parts, steps, and series of steps, as will be described in detail below.

In the drawings, the single figure is a schematic and diagrammatic illustration of a system in accordance with this invention operable in accordance with the methods hereinafter disclosed.

In the treating of boiler feed water by the hot lime-soda method, particularly the single stage method, there is considerable trouble encountered by scale formation in the chemical pumps and supply lines to the sedimentation tank. This scale formation is due in part at least to precipitated calcium carbonate which deposits in the pumps and supply lines and not only interferes with the proper operation thereof but requires frequent cleaning thereof. This scaling is serious enough so that frequent cleaning is necessary causing interruption of service and maintenance expense as well as the use of special mechanical devices, such as flexible piping, to facilitate cleaning without rectifying the fundamental trouble.

In accordance with this invention it has been found that the recirculation of the sludge formed in the sedimentation tank back to the chemical suction tank prevents scale formation in the chemical pumps and lines and eliminates the necessity of the frequent cleaning thereof. Sufficiently long actual use of the principles of this invention has demonstrated that whereas these recirculation lines formerly had to be cleaned at least once a week they now run for months without cleaning. It is noted by way of explanation but not limitation that the effectiveness of the invention is due to the fact that the sludge from the sedimentation tank contains iron, magnesium and aluminum hydroxides which react with precipitated calcium carbonate to form a gel suspension which does not deposit in the pumps and lines to form scale. Actual use of this invention also indicates that the efficiency of the water treating cycle is improved by sludge recirculation particularly in that more sludge settles out in the sedimentation tank and more use of the chemicals employed is obtained.

Referring now to the drawings, the sedimentation tank is diagrammatically illustrated at 10. Such devices are known in the art in a number of forms as, for example, that used in the Graver treating system which employs a chemical solution for the water treatment. The invention, however, is not limited to the chemical solution treating processes since it finds equal utility in systems using "dry" chemicals such as the Worthington treating system. In the mechanism illustrated in the drawings, there is shown a suitable form of impeller agitator 13 driven by an electric motor 12 to maintain the proper agitation and circulation of fluids in the treating zone of the sedimentation tank. Steam, when required, is delivered to the sedimentation tank through the supply line 11 and the raw water to be treated is introduced through the line 15 into the tank 10. The treated water is withdrawn from the tank through the line 14.

Connected in the line 15 is any suitable form of fluid indicating and proportioning meter for controlling the incoming stream of raw water to be treated. In accordance with well known practice, this proportioning meter 16 is connected to a swing line 18 in the concentrated chemical solution tank 19. This tank is provided with the agitator and mixer 21 driven by the electric motor 20 all in accordance with the usual practice. Water, soda ash and lime are introduced into the tank 19 in any suitable manner to maintain a sufficient supply of concentrated chemical solution. The amount of this solution delivered from the tank 19 is varied by the swing line 18 under the control of the proportioning meter 16 so that the necessary amount of fresh chemical will be supplied to the sedimentation tank in accordance with the rate of raw water feed supplied to that tank.

In accordance with known practice, the concentrated chemical is delivered through the line 22 to the chemical dilution box 23 and from there is supplied by line 24 to the intake of the chemical pump 25. The output line 26 of this pump supplies the diluted chemical to the treating section of the tank 10. All of the foregoing described apparatus is but a diagrammatic illustration of one form of Graver treating system commonly employed in the treatment of boiler feed water.

It is the chemical supply lines 22, 24 and 26 and the pump 25 which have been subject to serious scaling, as previously described, to such an extent as to seriously interfere with the efficient operation thereof.

The prevention of this scaling is accomplished by recirculating back from the sedimentation tank 10 the sludge formed therein and delivering it into the dilution box 23 for return in mixture with the fresh chemical to the sedimentation tank. As illustrated in the drawing, this can be accomplished either by taking the sludge from the very bottom of the tank 10 through the line 27, or from a more elevated point in the tank through the line 31. It is within the contemplation of this invention to conduct the sludge through either line or through both lines as operating conditions indicate for the most efficient operation. The sludge from the bottom of the tank is a heavier more dense sludge, while the sludge returned through the line 31 is less dense, and when the sludge through the line 27 tends to clog the lines it can be mixed with a sufficient amount of the lighter sludge through the line 31 so as to prevent this plugging or clogging of the recirculation lines. Experience indicates that the sludge through either line prevents a scale formation and hence these alternative connections are merely to facilitate the recirculation of the sludge. The sludge from either or both points is conducted to the intake of the pump 30 and delivered by that pump through the line 32 into the dilution box 23. The line 27 is provided with a branch leading to the sludge receptacle 28 which is merely a diagrammatic illustration of any method of disposing of the excess sludge even including disposal to waste. These various lines are provided with the necessary valves to effect the proper proportioning of the flows as those skilled in the art will appreciate. At this point it may be noted that the other lines will be provided with suitable valves well known in the art to effect the desired proportioning and control of fluid flows. They have been omitted in the interest of simplicity of disclosure.

The chemical solution and sludge flows are proportioned so that the pump 25 will supply all the fresh solution required for the proper treatment of raw water supplied to tank 10 and the remainder of the capacity of the pump 25 is supplied by sludge. For example, if the pump 25 has a rate of capacity of ten gallons per minute and fresh chemical is required at the rate of five gallons per minute, then the pump 25 will handle in addition five gallons per minute of sludge. It is obvious that these flow rates can be readily adjusted to the desired balance.

The chemical supply lines instead of being flexible tubes such as rubber hose may be made of rigid conduits permanently connected in place. It may be noted that the various sludge and chemical supply pipe lines can be of any size suitable for handling the respective mixtures without regard to allowance for scale formation because of the prevention by this invention of the formation of substantially any scale therein even over long periods of operation.

Another advantage of this apparatus and method is that the treated water being delivered through the line 14 for whatever use requires less filtering equipment than has heretofore been necessary in systems of this type.

From the above description it will be apparent to those skilled in the art that the subject matter of this invention is capable of some variation not only in the apparatus but in the details of method operation and we do not, therefore, desire to be strictly limited to the disclosure as given for purposes of illustration but rather only by the claims granted.

What is claimed is:

1. In a water treating system, the combination comprising a sedimentation tank, a chemical solution tank, a raw water feed line to said sedimentation tank, a chemical feed line including a chemical pump, said chemical feed line connecting the chemical solution tank to the sedimentation tank, and means including a pipe connection from said sedimentation tank to said chemical feed line at a point prior to passage of chemical solution through the chemical pump for recirculating sludge from and to said sedimentation tank through said chemical feed line.

2. In an apparatus for chemically treating water, the combination comprising a sedimentation tank, means for supplying all raw water to be treated to said tank, separate means including pipe lines for supplying water treating chemicals to said tank, and means for withdrawing untreated sludge from said tank and adding it to the water treating chemicals in said separate means, said means for withdrawing sludge from the sedimentation tank including pipe connections from the bottom of and at a point above the bottom of said tank.

ALBERT H. HALLIER.
GLENN F. HARRIS.
WALTER C. KINCAID.
EDWARD R. DENSON.
ROBERT H. DAVIS.

REFERENCES CITED

The following references are of record in the file of this patent:

UNITED STATES PATENTS

| Number | Name | Date |
|---|---|---|
| 1,604,126 | Kern | Oct. 26, 1926 |
| 1,620,332 | Evans | Mar. 8, 1927 |
| 1,752,795 | Hoover et al. | Apr. 1, 1930 |
| 1,951,205 | Rather et al. | Mar. 13, 1934 |
| 2,054,798 | Gibson | Sept. 22, 1936 |
| 2,074,082 | Domogalla | Mar. 16, 1937 |
| 2,077,498 | Streander | Apr. 20, 1937 |
| 2,287,486 | Reichelt et al. | June 23, 1942 |
| 2,296,713 | Hinsch | Sept. 22, 1942 |
| 2,325,679 | Hughes | Aug. 3, 1943 |
| 2,336,659 | Welp | Dec. 14, 1943 |

FOREIGN PATENTS

| Number | Country | Date |
|---|---|---|
| 22,546 | Great Britain | 1891 |
| 188,137 | Germany | Sept. 30, 1907 |
| 251,205 | Germany | Sept. 27, 1912 |
| 757,634 | France | Oct. 16, 1933 |